A. D. JONES.
SOUND BOX FOR TALKING MACHINES.
APPLICATION FILED MAR. 26, 1914.
1,118,653.
Patented Nov. 24, 1914.
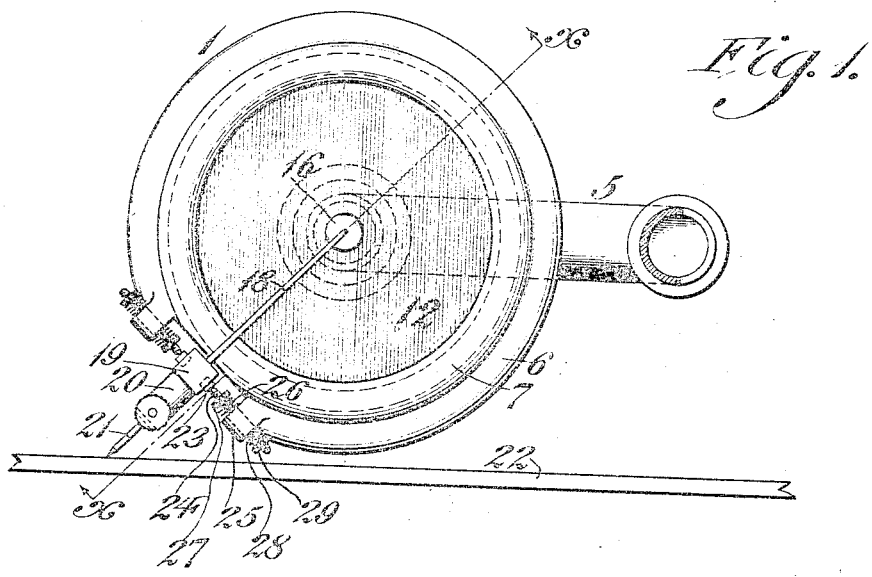
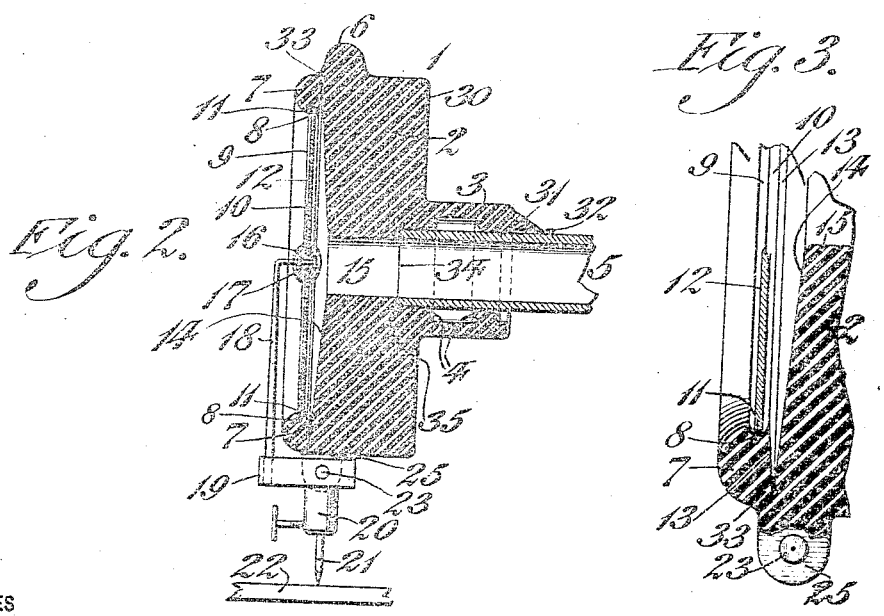
WITNESSES
INVENTOR
Alva D. Jones.
BY
ATTORNEYS

UNITED STATES PATENT OFFICE.

ALVA D. JONES, OF PHILADELPHIA, PENNSYLVANIA.

SOUND-BOX FOR TALKING-MACHINES.

1,118,653.

Specification of Letters Patent. Patented Nov. 24, 1914.

Application filed March 26, 1914. Serial No. 327,353.

*To all whom it may concern:*

Be it known that I, ALVA D. JONES, a citizen of the United States, residing in the city and county of Philadelphia, State of Pennsylvania, have invented a new and useful Sound-Box for Talking-Machines, of which the following is a specification.

In sound boxes for talking machines, as generally constructed, the sound reproducing diaphragm is detachably held in position by one or more detachable annuli of rubber or similar material and the sound box is composed of a plurality of metallic and rubber parts united together by screws, the various parts having rubber insulation between them, whereby the cost of production is greatly increased.

It is further well-known that most sound boxes in use frequently emit a metallic or scratchy sound accompanying the reproduction of sound from the sound reproducing tablet. By my present invention, I construct the entire sound box body of a single body of rubber or similar suitable material, the main body portion of the box having attached thereto by an annular, resilient, integral hinge, a front annular bead, having a diaphragm seat therein, said bead being softer or semi-cured with respect to the sound box body, which latter is harder or cured to a harder degree than said front annular bead containing the diaphragm seat.

I have discovered as the result of an extensive series of experiments, that rubber when properly cured to the requisite degree, possesses many characteristics of the human throat when employed for a sound reproducing agent, and by constructing the entire sound box body of rubber and mounting the diaphragm in a seat within the front annular bead, which is softer than the sound box body, I have produced a device whereby the sound delivered from the diaphragm is greatly mellowed and improved, and a clear and distinct articulation obtained; provision thus being made for the diaphragm to be yieldingly supported so that it has capacity for vibration adjacent to its perimeter as well as its center, my novel sound box and its adjuncts being inexpensive to construct, sensitive in action, easily and quickly repaired and readily accessible for the purpose of inspection or replacement of parts, means being thus provided for a general improvement of the tones, amelioration of the scratchy, metallic or grinding sounds common in instruments of this class, and provision being thus made for a faithful development and reproduction of the delicate sounds ordinarily difficult to reproduce, which are reproduced by my device with a maximum degree of fidelity and faithfulness to the original.

To the above ends, my invention consists of a novel construction of a one-piece sound box composed of rubber or similar material, wherein the body portion is thickened and cured to the requisite degree of hardness, said body portion having integral with or secured to the front portion thereof, an annular bead encircling and containing the diaphragm, the material of which said bead is composed being softer than the body of the sound box, whereby the requisite capacity for the vibration of the diaphragm at its outer and intermediate portions is provided.

It further consists of a novel construction of a sound box having a one-piece body of rubber or similar material of varying degrees of hardness, within the softer portion of which the mica or other diaphragm is cast or molded, without necessitating the employmen of extraneous fastening devices.

It further consists of a novel method of molding or casting my novel sound box body.

It further consists of other novel features of construction, all as will be hereinafter fully set forth.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a sound box for talking machines, gramophones, graphophones and the like, embodying my invention. Fig. 2 represents a section on line $x$—$x$ Fig. 1. Fig. 3 represents a view similar to a portion of Fig. 2, showing the sound box on an enlarged scale.

Similar numerals of reference indicate corresponding parts in the figures.

Referring to the drawings:—1 designates my novel construction of sound box having the rear wall 2 of considerable thickness, and provided with the rearward extension 3, having the internal, annular rib or ribs 4, which are adapted to frictionally engage the tube 5 of the reproducer or horn element, (not shown). The outer forward portion of the sound box body is provided, in the present instance, with a peripheral bead 6, which may be omitted, but which in the present instance terminates in the front annular bead 7, which has a preferably V-shaped annular seat 8 formed by the walls 9 and 10, said seat being adapted to receive the peripheral outer edge 11 of the diaphragm 12, which edge is preferably square, as will be understood from Fig. 3. The inner wall 10 (see Fig. 3) of the seat 8 has projecting outwardly therefrom the inclined wall 13, which meets the inclined front wall 14 of the sound box body, which terminates in the opening 15, whereby the reproduced tone waves are conveyed to the sound conveying member 5. The diaphragm 12 has an opening therein at about its center, wherein is located a mass of suitable cementing material 16, such as rubber or the like, in which is imbedded the end 17 of the stylus arm 18, at the lower portion of which is the bar 19, which carries the chuck 20 for the stylus 21, which engages the rotary tablet 22 of the usual construction. A pivot-block or bearing 23, of hard material, such as a jewel or semiprecious stone, is secured in each side of the bar 19 of the stylus-support, and the pointed inner ends of two pins, 24, engage such pivot-blocks and are freely adjustable in transverse bores in ears or lugs, 25, preferably formed integral with the sound box body and upon the periphery of the same. Nuts, 27 and 29, fit upon each of said pins at the inner and outer sides, respectively, of the ears, and tension devices or springs, 26 and 28, are coiled around the pins and held between the nuts and the ears, so that the pins form yielding pivot-supports for the stylus-support 19.

It will be understood that the above described construction of floating bearings is substantially identical with the construction described in my prior application, Serial #820,643, filed February 24th, 1914, the stylus holder being permitted to freely vibrate to a limited extent between the lugs 25, as is evident.

It will thus be seen that by my novel construction, I have provided a novel bearing on each side of the stylus holding device, which will be extremely durable, and whereby an exceedingly faithful reproduction of the desired sounds will be had.

In the construction or manufacture of my novel sound box, I preferably employ rubber or similar material, and produce the same by the operation of molding or casting, particular attention being directed to the fact that the front wall 14 of the box and the body or mass of material contiguous thereto, is of about the same degree of hardness as the rear wall 30 and the mass of material contiguous thereto, which can be readily effected by those skilled in the art during the operation of casting or molding the rubber of which the box is composed. Especial attention is also directed to the fact that the front bead 7, containing the diaphragm seat 8, together with its rear wall 13, is made of softer or semi-cured rubber, which is secured to the harder body portion by an annular, integral, resilient hinge 33, the front bead 7 containing the diaphragm seat 8 being semi-cured or softer than the portions 14 and 30 of the sound box body. By this construction, all scratchy, harsh or metallic sounds are absorbed in the body portion 2, which I preferably make of considerable thickness, and by locating the annular diaphragm seat 8 in the softer front bead 7, I attain the requisite resiliency for the vibratory member 7, whereby the diaphragm is permitted to vibrate near its periphery, as well as at its center, to the requisite extent.

By casting the lugs 25 of the same material as the sound box body, it will be seen that all undue chatter or vibration of the stylus holder and its adjuncts will be absorbed, since in no instance in my novel construction does metal come in contact with metal. I desire to also call especial attention to my manner of securing the terminal 17 of the stylus arm to the diaphragm, since by the employment of the mass of cementing material or rubber 16, the metal of said stylus arm is prevented from contacting with said diaphragm so that there is no possibility in any portion of my device for any chattering or improper vibration or rattling to take place, (which will impair a faithful reproduction,) which will not be absorbed in a proper manner.

I desire to also call attention to the fact that I dispense with the bayonet joint commonly employed to effect the interlocking of the rearward extension 3 with the tube 5, since in the present instance, I provide a pointer 31 thereon adapted to aline with a pin or mark 32 on the tube 5, whereby upon said pointer and pin being properly alined, the stylus 21 will contact with the disk or tablet 22 at the proper angle. By casting or molding the entire sound box in one piece of rubber or similar material, having the proper portions thereof semi-cured or softer than other portions as described, I am enabled to greatly reduce the cost of production and to dispense with the plurality of rubber and metallic parts, such as screws, nuts, knife edges and the like, heretofore employed, at the same time producing a device of superior excellence.

It will be apparent from Fig. 3, that by reason of the diaphragm seat 8 being composed of the inclined walls 9 and 10, the square, peripheral edge of the diaphragm 12, which is assembled simultaneously with the molding of the semi-cured, annular bead, 7, will at all times properly contact or engage with said walls 9 and 10, and by reason of the annular, resilient, integral hinge at about the point 33, which forms the point of junction between the annular, semi-cured bead 7 and the fully cured sound box body 2, sufficient play or vibration will be imparted to said bead 7 containing the diaphragm seat 8, so that the outer peripheral portions of the diaphragm will be permitted to have the requisite extent of vibration, as will the central and intermediate portions of said diaphragm.

In practice, the body portion 2, which comprises substantially the mass of material between the walls 14 and 30 in my method of molding or casting my novel sound box, may be at first semi-cured and then the annular bead or ring 7 which may be first shaped independent of the sound box body 2 with the diaphragm therein, can be integrally united with the outer portion of the wall 14 at the point 33, after which the curing of the mass of rubber is completed, the body portion 2 of the box being then completely cured, and the front, annular, peripheral bead 7 being semi-cured, so that the desired degree of comparative softness and hardness as regards the front bead 7 and the sound box body 2 can be readily attained by those skilled in the art.

It will be apparent that the molding or casting of the sound box body in its entirety, as the same appears in Fig. 2 with the diaphragm 12 assembled within the encircling front bead 7 of softer material, may be effected in various other ways than that described, but inasmuch as I believe myself to be the first in the art to produce a sound box body of the character described, having a diaphragm retaining portion of soft material and an integral thickned body portion of harder material for the purpose stated, I reserve the right to make all such changes as will come within the spirit of my invention or the scope of the appended claims.

It will be seen that by the employment of the rubber or other cementing material 16, whereby I effect the assembling of the terminal 17 with the diaphragm 12, as will be understood from Fig. 2, said terminal being preferably provided with a plurality of heads or rings, that there can be no vibration or chatter between the stylus arm 18 and the diaphragm 12, and by the securing of the extension 3 upon the tube 5, by frictional means or its equivalent, in lieu of the bayonet joint generally employed, there is in no instance whatever, in my present invention, any opportunity for any mechanical, scratchy, metallic or grinding noises to be reproduced or created during the sound reproducing operation of my device.

So far as I am aware, I am the first in the art to produce a sound box of the character described out of rubber or similar material, having portions thereof of varying degrees of hardness, for the purpose stated, and my claims to my novel product, as well as my claims to the method of making the same, are to be construed with the corresponding score awarded to a pioneer invention. I also desire to call attention to the manner in which the terminal 34 of the sound conveying tube 5 is seated against the shoulder 35, in the sound box body 2, these parts being united in such a way that the opening or passage 15 is of substantially the same diameter as the inner bore of the tube 5, so that the sounds are not broken or interrupted by any sharp angles formed by the union of the tube 5 and body portion 2, the effect of which is evident. I furthermore provide an extended, frictional bearing for the tube 5 within the extension 3 of the sound box, so that after these parts are once properly assembled with respect to each other, they will not readily become displaced. The neck 3 may be semi-cured or slightly softer than the body portion 2, if desired, so as to snugly hug the contiguous portion of the tube 5.

It will now be apparent that I have devised a novel and useful construction of a sound box for talking machines, graphophones, gramophones and the like, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars, without departing from the spirit or scope of the invention or sacrificing any of its advantages.

Having thus described my invention, what I claim as new and desire to secure by Letters Patent, is:—

1. As an improved article of manufacture, a one-piece sound box body composed of resilient material, the front annular portion of which is adapted to surround the periphery of a diaphragm and is softer than the other portions of said sound box body, for the purpose described.

2. A sound box body having a thickened rear wall and a front, annular, peripheral bead, secured to said wall by an annular, integral, resilient hinge, said bead encircling a diaphragm seat, and being capable of vibration independently of said body portion.

3. A sound box body having a thickened rear wall, and a front, annular, peripheral bead, of softer material than said body, said bead being provided with an annular, internal diaphragm seat, said bead and its seat being integral with said body and being capable of vibrating independently of said body.

4. As an improved article of manufacture, a one-piece sound box body made from rubber, said body having a front peripheral bead thereon encircling an annular seat for a diaphragm, and said body having an internal chamber in the rear of said diaphragm seat of greater diameter than the latter, said bead and seat being secured to said body by an annular, resilient, integral hinge, permitting vibration of said bead.

5. A sound box body having a thickened rear wall, a front, annular bead of softer material than said body, and provided with an annular diaphragm seat, said bead and its seat being integral with said body and being capable of vibrating independently of said body, and a diaphragm seated in said seat within said bead and capable of vibration in unison with said bead.

6. The combination of a diaphragm and a one-piece sound box body composed of resilient material of varying degrees of hardness, the portion of said box body encircling said diaphragm being softer than said body in the rear of said diaphragm.

7. The combination of a diaphragm, a one-piece sound box body composed of resilient material of varying degrees of hardness, the portion of said box body encircling said diaphragm and in which said diaphragm has its seat being softer than the other portions of said body in the rear of said diaphragm, said diaphragm seat being secured to said body by an annular, resilient, integral hinge, a stylus arm having its terminal located in an aperture in said diaphragm, and a mass of cementing material common to said terminal and said diaphragm, whereby the latter are secured, so as to vibrate in unison but out of contact with each other.

8. The combination of a sound box body of hard rubber, a front annular bead therein of softer rubber having a diaphragm seat therein, and an annular, resilient, integral hinge common to said bead and sound box body.

9. The combination of a sound box body of hard rubber, a front annular bead therein, of softer rubber, having a diaphragm seat therein, an annular, resilient, integral hinge common to said bead and sound box body, and a diaphragm secured in said seat.

10. A sound box body having a front annular bead thereon, said bead being provided with converging walls whereby a diaphragm seat is formed, said body having a chamber in the rear of said bead formed of converging walls, said last mentioned chamber being of greater diameter than said diaphragm seat, in combination with a diaphragm secured in said diaphragm seat, a stylus arm having its terminal located within an aperture in said diaphragm, and a body of cementing material common to said terminal and diaphragm, whereby the two latter are held in juxtaposition but out of contact with each other.

11. A sound box body having a front annular bead thereon, said bead being provided with side walls, whereby a diaphragm seat is formed, said body having a chamber in the rear of said bead, formed with converging walls, said last-mentioned chamber being of greater diameter than said diaphragm seat, and said bead and body being connected by an annular integral hinge.

12. A sound box body having a front annular bead thereon, said bead being provided with annular converging walls, whereby a diaphragm seat is formed, said body having a chamber in the rear of said bead, formed with converging walls, said last mentioned chamber being of greater diameter than said diaphragm seat, and said bead and body being connected by an annular integral hinge, in combination with a diaphragm secured in said diaphragm seat.

13. As an improved article of manufacture, a one-piece sound box body, the front annular portion thereof being adapted to surround and encircle a diaphragm, and a hollow rearward integral extension on said body softer than the latter and provided with an internal, annular rib adapted to engage a reproducer tube.

14. As an improved article of manufacture, a one-piece sound box body having a thickened rear wall, a front annular, peripheral bead having a diaphragm seat therein integral with said body, and a rearward hollow extension on said body, said extension and bead being both softer than said body.

15. A sound box body having a thickened rear wall and a front, annular, peripheral bead secured to said wall by an annular, integral, resilient hinge, said bead encircling a diaphragm seat and being capable of vibration independently of said body portion, and a rearward hollow extension on said body softer than said body.

16. As an improved article of manufacture, a one-piece sound box body, the front annular portion thereof being adapted to surround and encircle a diaphragm, and being softer than said sound box body, and a hollow, rearward extension on said body also softer than the latter.

17. The combination of a sound box body having an integral diaphragm seat softer than said body, a diaphragm in said seat, a stylus arm having its terminal located in an aperture near the center of said diaphragm, but entirely out of contact therewith, and a mass of cementing material, common to said terminal and diaphragm, whereby the two latter are secured, so as to vibrate in unison but out of contact with each other.

18. As an improved article of manufacture, a one-piece sound box body, the front, annular portion thereof being adapted to surround and encircle a diaphragm, and being softer than said sound box body, a hollow, rearward extension on said body also softer than the latter, and lugs projecting from said body and integral therewith, adapted for the reception of cushioning devices for the stylus holder.

19. The combination of a sound box body, a diaphragm mounted in a seat therein, a stylus arm having its terminal provided with a plurality of heads, said terminal being located in an aperture near the center of said diaphragm, and said heads being on either side of said diaphragm said terminal being entirely out of contact therewith, and a mass of cementing material common to said terminal and diaphragm, whereby the two latter are secured so as to vibrate in unison but out of contact with each other.

20. In a sound box for talking machines, a body portion having lugs thereon, threaded stems having a smooth portion freely movable in bearings in said lugs, a stylus holder intermediate said bearings, bearings of hard material on each side of said stylus holder, the juxtaposed ends of said threaded stems being in engagement with said bearings, nuts on said threaded stems intermediate of said lugs and said bearings, cushioning devices intermediate said lugs and said nuts, nuts on the outer portions of said threaded stems, and cushioning devices intermediate said outer nuts and said bearings.

21. In a sound box for talking machines, a body portion having lugs thereon, threaded stems having a smooth portion movable in bearings in said lugs, a stylus holder intermediate said bearings, jeweled bearings on each side of said stylus holder, the juxtaposed ends of said threaded stems being pointed and engaging seats in said jeweled bearings, nuts on said threaded stems intermediate of said lugs and said jeweled bearings, tension devices intermediate said lugs and said nuts, nuts on the outer portions of said threaded stems, and tension devices intermediate said outer nuts and said bearings.

22. The combination of a reproducer tube and a one-piece sound box body, the front, annular portion thereof being adapted to surround and encircle a diaphragm, and a hollow, rearward, integral extension on said body softer than the latter and provided with an internal, annular rib adapted to engage said reproducer tube, said body having an internal recess in which the terminal of said reproducer tube is seated, the diameter of the bore through said body being substantially the same as and in alinement with the inner bore in said reproducer tube.

23. In a sound box for talking machines, a body portion having lugs thereon, threaded stems having juxtaposed pointed ends and a smooth portion freely movable in said lugs, a stylus holder intermediate said pointed stems, bearings formed in opposite sides of said stylus holder in which said pointed ends are seated, adjusting devices on said stems intermediate of said lugs and bearings, cushioning devices intermediate said lugs and adjusting devices, nuts on the outer portion of each of said stems and cushioning devices intermediate said outer nuts and lugs.

24. The combination of a diaphragm, a sound box body composed of resilient material, the front annular portion thereof being adapted to surround the periphery of said diaphragm and being integral with and softer than the body portion of said sound box, a stylus arm having its inner end secured to said diaphragm, and cushioning devices carried by said body, the outer portion of said stylus arm being supported by said cushioning devices.

25. The combination of a diaphragm, a sound box body composed of resilient material, the front annular portion thereof being adapted to surround the periphery of said diaphragm and being integral with and softer than said body, a stylus arm having its inner end secured to said diaphragm, lugs also integral with said body, and supporting devices for the outer portion of said stylus arm carried in said lugs.

26. The combination of a diaphragm, a sound box body composed of resilient material, the front annular portion thereof being adapted to surround the periphery of said diaphragm, and being integral with and softer than said body, a stylus arm having its inner end secured to said diaphragm, lugs also integral with said body, supporting devices for the outer portion of said stylus arm carried by said lugs, and a rearward hollow extension on said body of softer material than said body and adapted to engage a suitable support.

ALVA D. JONES.

Witnesses:
E. HAYWARD FAIRBANKS,
C. D. McVAY.